Sept. 2, 1947.  R. C. BOYD  2,426,919
CONTROL DEVICE
Filed Aug. 31, 1944  2 Sheets-Sheet 1

WITNESSES:  INVENTOR
Robert C. Boyd
BY
ATTORNEY

Sept. 2, 1947.  R. C. BOYD  2,426,919
CONTROL DEVICE
Filed Aug. 31, 1944  2 Sheets-Sheet 2

WITNESSES:
Edward Michaels
Arthur T. Stratton

INVENTOR
Robert C. Boyd.
BY
Ralph H. Swingle
ATTORNEY

Patented Sept. 2, 1947

2,426,919

UNITED STATES PATENT OFFICE 2,426,919

CONTROL DEVICE

Robert C. Boyd, Forest Hills, Pa., assignor to Westinghouse Electric Corporation, East Pittsburgh, Pa., a corporation of Pennsylvania Application August 31, 1944, Serial No. 552,170

14 Claims. (Cl. 200—5)

This invention relates, generally, to electric circuit controllers and, more particularly, to means for coordinating the operation of a plurality of circuit controllers in a particular manner, and to means interlocking such controllers to prevent improper operation thereof.

Where circuit controllers, such as switches or circuit breakers, are required to operate in a definite sequence, such, for example, as in the control of motors where it is necessary to have a line controller and, in addition, controllers for starting and running circuits, it is highly desirable that some interconnection be employed to cause operation of at least certain of the controllers in the desired sequence, and to prevent their operation in any other manner.

Accordingly, one object of this invention is to provide novel means for controlling the operation of a plurality of circuit controllers.

Another object of this invention is to provide novel means for actuating one circuit controller from another which is dependent upon the condition of a third circuit controller.

Another object of this invention is to provide novel interlock means for a plurality of circuit controllers to prevent their operation other than in a predetermined sequence.

These and other objects of this invention will become more apparent upon consideration of the following detailed description of a preferred embodiment thereof, when taken in connection with the attached drawings, in which.

Figure 1:
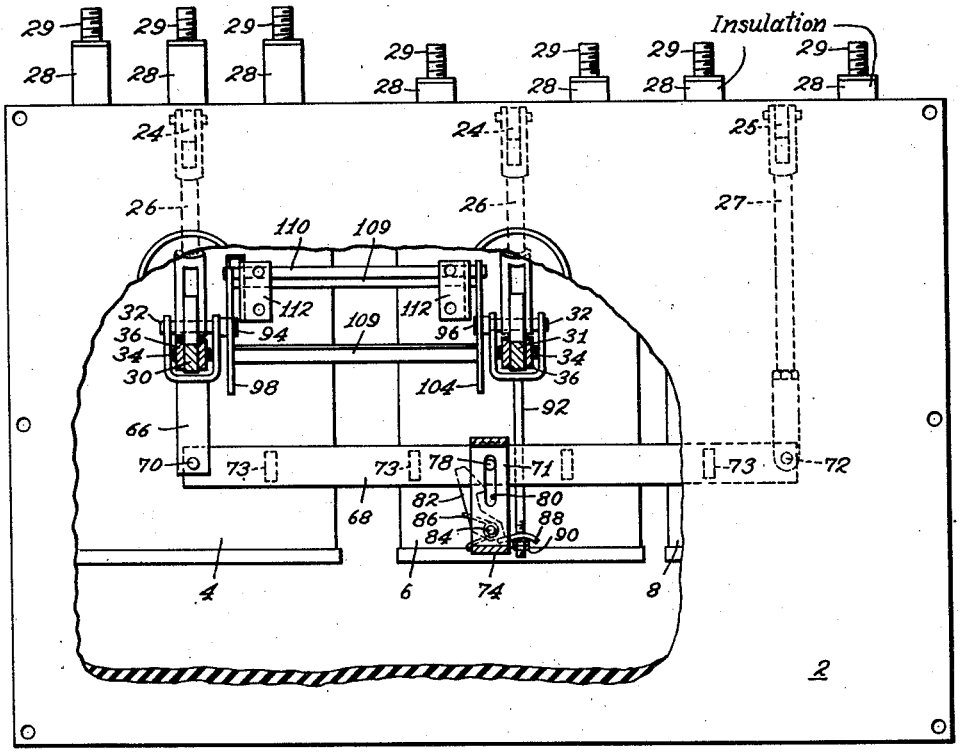
Figure 1 is a front elevation view of a panel section having a plurality of circuit controllers assembled thereon in accordance with this invention, and with a part of the panel broken away with certain of the parts behind the panel shown in section.

Referring to the drawings, this invention is illustrated therein as assembled on a panel section 2 of any desired material, such as insulating material, or provided with a facing of insulating material, in any well known manner. Three circuit breakers 4, 6, and 8 are illustrated mounted at the rear of panel section 2. These circuit breakers may be of any desired type; however, for purposes of illustration, it is assumed that they are all of the same general type, that is, of a conventional liquid-filled type having stationary contacts 10 mounted in a tank, supported from the tank cover by bushings 28 which extend through the cover, to have terminals 29 at the outside of the circuit breaker tanks. The fixed contacts 10 of each breaker are adapted to be engaged by a movable bridging contact 12 mounted on a contact supporting rod 14, which is pivotally mounted at its upper end on the inner end of a contact operating lever 16. The breakers each include more than one set of stationary contacts 10 and cooperating bridging contact 12, to control more than one phase, with breaker 4 illustrated as having three sets of contacts, and breakers 6 and 8 having two sets of contacts. The contact actuating lever 16 for each set of breaker contacts is mounted on a square operating shaft 18 which extends to the exterior of the casing cover portion 9 of each breaker to have mounted thereon an actuating crank 20, which is connected by a pivoted connecting link 22 to one arm of a bell-crank lever 24, with the other arm of the bell-crank lever pivotally connected with an operating link 26. The breakers illustrated have their movable bridging contacts 12 biased to the open circuit position by a spring 21, which reacts between the inner side of the breaker casing cover and a shoulder on contact actuating rod 14, to thereby normally bias bridging contacts 12 to the open circuit position.

Figures 2, 7:
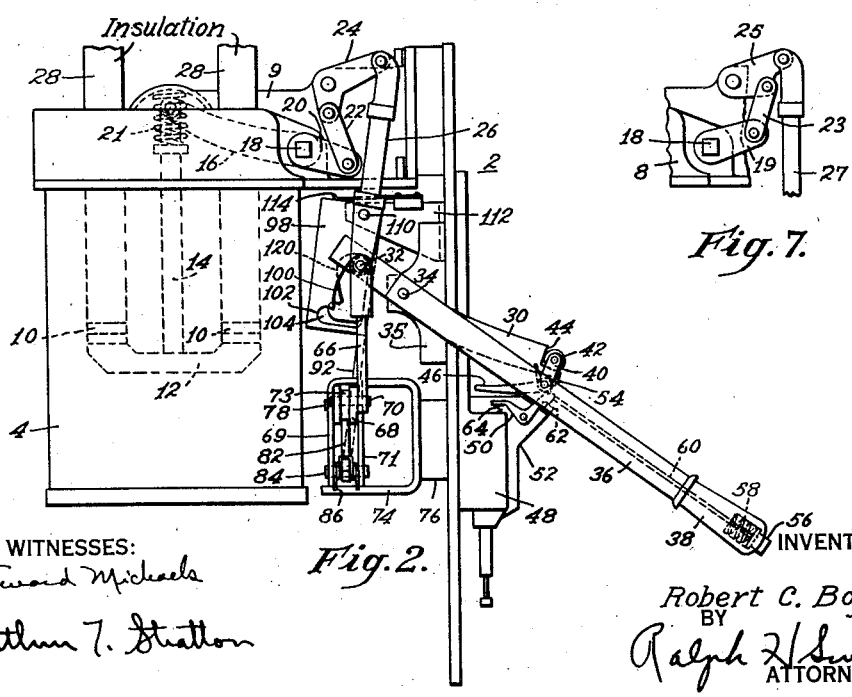
Fig. 2 is an end elevation view of the assembly shown in Fig. 1.
Fig. 7 is a partial elevation view of the actuating mechanism for one circuit breaker.

Breakers 4 and 6 are identical in structure except that breaker 6 is a two-phase breaker, whereas breaker 4 is a three-phase breaker, but, otherwise, the contact structures thereof and operating mechanisms are identical. The same is true of breaker 8, except that the operating link 27 of this breaker is connected to operating shaft 18 by a lever 25 which is connected by links 23 to crank 19 on shaft 18, as shown in Fig. 7. The arrangement is such that in the upper position of operating link 27 the breaker contacts are opened, whereas in the upper position of links 26, the contacts of breakers 4 and 6 are in their closed circuit position.

Breakers 4 and 6 are provided with manually operable actuating handles, whereas breaker 8 does not have such an operating handle, because in the particular embodiment of the invention disclosed herein, breaker 8 is adapted to be actuated from breaker 4, under the control of breaker 6, in a manner to be hereinafter pointed out. The particular arrangement of circuit breakers and actuating mechanism illustrated is for the purpose of controlling operation of a motor or the like, where circuit breaker 4 is used as the main line breaker, and hence needs to be a three-phase breaker. Circuit breakers 6 and 8 are of the two-phase type, because it is merely necessary for these breakers to control starting and running circuits of the motor, with circuit breaker 6 adapted to control the running circuit, and circuit breaker 8 adapted to control the starting circuit.

The actuating means for circuit breakers 4 and 6 comprise actuating levers 30 and 31, respectively, which are pivotally connected as by a pivot 32 with the lower ends of their respective operating links 26. Actuating levers 30 and 31 are adapted to be pivotally mounted as by separate pivot pins 34 on a stationary mounting bracket 35 which may be suitably secured to the inner face of panel section 2. A split handle structure 36 is also supported on each pivot pin 34, with actuating levers 30 and 31 received between the sides of such split handle structures, and the outer ends of the handle structures are provided with hand grips 38. Each handle structure pivotally carries at a point thereon adjacent the outer end of actuating levers 30 and 31, a latch lever 40 having a roller catch 42 thereon for engagement with a notch 44 provided in the outer end of its associated actuating lever 30 or 31. Each latch lever 40 is biased to engage roller 42 in notch 44 by a spring 54, and is provided with an extension 46 adapted when the breakers are in closed circuit position to overlie a trip unit 48. Trip units 48 may be of any conventional type, and may comprise a solenoid or other current-responsive device having a core or other movable member which is adapted to be moved into engagement with extension 46 of latch levers 40 in response to predetermined electrical conditions, to release latch 40 of handle structures 36, and thus permit the contact biasing springs 21 of the associated breaker to open the circuit. In order to hold the breakers in their closed circuit positions, handle structures 36 are each provided with a latch 50 which may be pivotally mounted on a supporting plate 52 mounted on panel 2 for engagement with a transverse catch member 62 secured between the sides of split handle structure 36. A spring 64 is illustrated for biasing latch 50 into latching engagement, and a push button 56 is illustrated as being mounted in a bore through each hand grip 38, for the purpose of releasing the latch 50 associated therewith, when it is desired to effect a manual circuit opening operation. The release push buttons 56 are normally biased outwardly by compression springs 58 mounted within hand grips 38, and are provided with push rods 60 adapted to engage latch 50, when push button 56 is depressed, to move latch 50 out of engagement with catch member 62, so that the breakers may be actuated to open the circuit.

In the operation of the circuit breakers and their operating mechanisms thus far described, it is apparent that with the breakers in the closed circuit position illustrated in Figs. 1 and 2, breakers 4 and 6 may be manually operated to open circuit position by depressing push buttons 56 thereof and moving handle structure 36 in a counterclockwise direction from the position shown in Fig. 2. Actuating levers 30 and 31 will follow such movement of the handle because breaker opening springs 21 exert a bias on bridging contacts 12 in a direction to move them away from fixed contacts 10 to cause counterclockwise rotation of operating levers 16, and consequent clockwise rotation of bell cranks 24 to move connecting links 26 downwardly and actuating levers 30 and 31 in a counterclockwise direction, thus causing them to follow corresponding movement of the handle structures. Circuit breakers 4 and 6 may also automatically open by operation of trip units 48 to release latch levers 40, and thus free actuating levers 30 and 31 from their respective handle structures, and permit contact opening springs 21 to open the circuit. Such automatic opening of the breakers does not affect handle structures 36, as they are left at the full line position illustrated in Fig. 2. In order to close the circuit after an automatic opening operation, it is necessary to then move handle structures 36 in a counterclockwise direction about their supporting pivots 34 until latch 40 re-engages actuating levers 30 and 31, whereupon the handle structures may be rotated in the reverse or counterclockwise direction carrying actuating levers 30 and 31 therewith, to cause reverse movements of the contact actuating mechanism and bridging contacts 12 to reclose the circuit. It will be observed that handle structures 36 are trip-free of the breakers, because even though held in the position shown in Fig. 2, the breakers may automatically operate to open the circuit in response to operation of trip units 48.

As previously stated, the particular arrangement illustrated is adapted for the control of a motor or the like, with circuit breaker 4 constituting the main line breaker, circuit breaker 6 constituting the control for the motor running circuit, and circuit breaker 8 adapted to control the motor starting circuit. Obviously in operating these breakers to operate the motor, it is necessary that line breaker 4 and starting circuit breaker 8 be closed first, and that when circuit breaker 6 is closed thereafter, circuit breaker 8 be opened at the same time. In order to provide means for accomplishing this particular sequence of breaker operation, an operating link 66 is pivotally attached to pivot pin 32 of breaker 4, and is adapted to pivotally support by means of a pivot pin 70, one end of an operating lever 68. The operating lever 68 is illustrated as comprising a pair of spaced bars held in predetermined spaced parallel relation by a plurality of spacer blocks 73, welded or otherwise secured between the bars of lever 68. The other end of operating lever 68 is pivotally connected to the lower end of operating link 27 of circuit breaker 8, as by a pivot pin 72. Intermediate the ends of operating lever 68 adjacent circuit breaker 6, the operating lever passes through an open frame 74, which is supported as by a bracket 76 mounted on panel section 2. Frame 74 is provided with a pair of spaced guide plates 69 and 71 disposed in parallel relation with operating lever 68 received therebetween. A pivot pin 78 is provided on operating lever 68 at the point where it passes through frame 74, with this pin projecting from opposite sides of the operating lever, to be received in guide slots 80 provided in guide plates 69 and 71. Frame 74 also supports a latch 82 pivotally mounted between guide plates 69 and 71 of frame 74 by a pivot pin 84, and adapted to be received between the side bars of lever 68. Latch 82 has a biasing spring 86, which biases the latch in a clockwise direction about its pivot 84, as viewed in Fig. 1, so as to normally engage pivot pin 78 and hold it against movement upwardly in guide slots 80. The latch lever is provided with an actuating extension 88 welded or otherwise secured to the latch, with extension 88 apertured to receive a release rod 92 pivotally mounted on actuating link 26 of circuit breaker 6, for example, as by the pivot pin 32 thereof. A pair of nuts 90 are mounted on the lower end of release rod 92 for engaging extension 88 of latch 82, to rotate it counterclockwise to release pivot pin 78 under certain conditions, to be hereinafter described.

Figure 3:
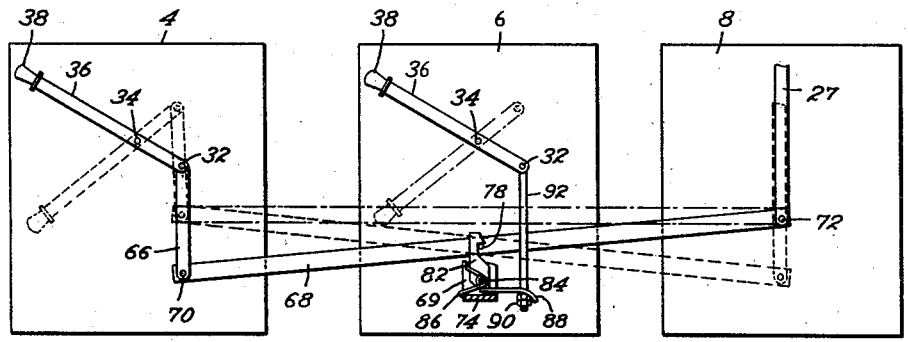
Fig. 3 is a diagrammatic view illustrating the mode of operation of a part of the operating mechanism for the circuit breakers shown in Figs. 1 and 2.

Referring to Fig. 3 of the drawings, which illustrates diagrammatically the operation of the mechanism interconnecting the circuit breakers, it will be observed that in the full-line position of the parts shown in Fig. 3, that all breakers are open, and pivot pin 78 of operating lever 68 is held by engagement of latch 82. Now, if main line breaker 4 is closed by depressing handle structure 36, the adjacent end of operating lever 68 will be raised, to thereby rotate the operating lever in a clockwise direction, as viewed in Fig. 3, about its pivot pin 78, to the dotted line position. This not only effects closure of the contacts of circuit breaker 4, but also closes the contacts of circuit breaker 8, to thereby energize the motor starting circuit. After the motor or other apparatus controlled by the circuit breakers has started, circuit breaker 6 should be closed to energize the running circuit of such apparatus. When this is done by depressing handle structure 36 of circuit breaker 6, this not only effects closure of the contacts of circuit breaker 6, but also raises release rod 92 to cause nuts 90 thereon to engage latch extension 88, and rotate the latch in a direction to release pivot pin 78 on operating lever 68. This permits the biasing spring 21 of circuit breaker 8 to open this breaker, resulting in movement of connecting link 27 upwardly to raise operating lever 68 to the dot-dash line position shown in Fig. 3. When circuit breakers 4 and 6 are opened, the opening of circuit breaker 4 will lower the adjacent end of operating lever 68 to restore the operating lever to the full line position shown in Fig. 3, and opening of circuit breaker 6 will permit latch 82 to be restored to the position shown, where it will reengage pivot pin 78, to thus restore all of the parts to their original positions shown in full lines in Fig. 3. Stated briefly, the mechanism thus far described results in closure of the contacts of circuit breakers 4 and 8 when the handle structure 36 of circuit breaker 4 is depressed, and results in opening of the contacts of circuit breaker 8 when the contacts of circuit breaker 6 are closed by depressing handle structure 36 of this breaker. This means that in the particular control arrangement previously referred to, that is, where breaker 4 is the main line breaker, breaker 6 controls a running circuit, and breaker 8 controls a starting circuit, this invention provides means for closing the main circuit by closing of circuit breaker 4, with the starting circuit being closed at the same time by closure of breaker 8, and that closure of the running circuit by closure of breaker 6 results in opening of the starting circuit by opening of breaker 8. Preferably, nuts 90 on release rod 92 are adjusted so as to release latch 82 and permit breaker 8 to open before the contacts of breaker 6 are fully closed, so that the starting and running circuits are not energized at the same time.

In order to insure proper sequence operation of the circuit breakers, interlocking means is provided for the operating mechanisms of circuit breakers 4 and 6. This interlocking means is associated with rollers 94 and 96 mounted on extensions of pivot pins 32 of the actuating mechanisms of breakers 4 and 6, respectively. Roller 94 associated with breaker 4 is adapted to engage in a cam opening 100, in a locking plate 98 mounted adjacent the actuating mechanism for breaker 4. Cam opening 100 is provided with a notch 102 for receiving roller 94 in one position of the locking plate, and the opening is also provided with an inwardly curved edge 118 extending above notch 102, for a purpose to be described. In a similar manner, roller 96 associated with the mechanism of breaker 6 is adapted to be received in a cam opening 106 provided in a locking plate 104, mounted adjacent the mechanism of breaker 6. Cam opening 106 is also provided with a notch 108 for receiving roller 96 at one position of the locking plate 104, and with an outwardly curved edge portion 120 extending above notch 108.

Locking plates 98 and 104 are rigidly connected together by a plurality of spaced connecting bars 109, rigidly secured to the respective locking plates in any desired manner, such, for example, as by welding. The locking plates are adapted to be pivotally mounted on a pivot bar 110 spanning the plates and mounted at its ends in supporting brackets 112, secured on the inner face of panel section 2. Pivot bar 110 is preferably located at the upper end adjacent one side of the locking plates, and the latter are biased for pivotal movement in a counterclockwise direction, as viewed in Figs. 2, 4, 5 and 6, by leaf springs 114, mounted on supporting brackets 112 in any desired manner, such as by rivets 116, and engageable at their outer ends with the locking plates at a point outwardly of pivot bar 110.

Figure 4:
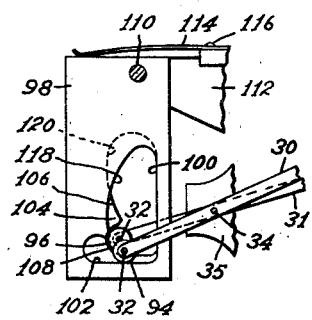
Fig. 4 is an elevation view of the interlocking means for the circuit breakers shown in Fig. 2, with the parts shown at their positions corresponding to the open circuit positions of the breakers.
Figure 5:
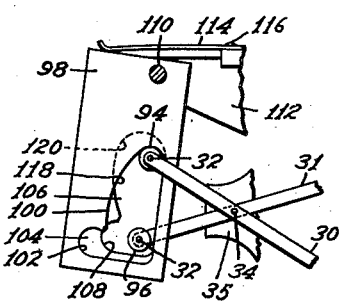
Fig. 5 is a view similar to Fig. 4 but showing the parts in the position they assume when one of the breakers is closed.
Figure 6:
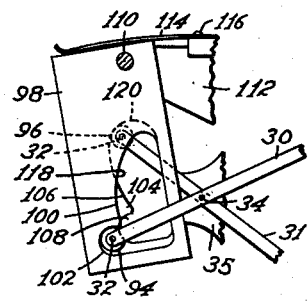
Fig. 6 is a view of the interlocking mechanism like Figs. 4 and 5, but with the parts shown in the position they assume when another circuit breaker is in its closed circuit position.

Fig. 4 illustrates the position of the interlocking structure when the breakers are open, and corresponds to the full-line position of the operating mechanism shown in Fig. 3. It will be observed that when the breakers are at their open circuit positions, rollers 94 and 96 associated with the operating mechanisms of breakers 4 and 6 are at the lower portions of cam openings 100 and 106 in the locking plates, with roller 96 associated with breaker 6 being received in notch 108 provided in locking plate 104, and held therein by leaf springs 114 which causes the inner edge of notch 108 to be held against roller 96. This positively prevents closure of circuit breaker 6, but since roller 94 is clear of notch 102 in locking plate 98, breaker 4 may be closed. Assuming that breaker 4 is closed, in moving upwardly, roller 94 engages the inwardly curved edge 118 of opening 100 in locking plate 98, to cause clockwise rotation of the locking plates to the position shown in Fig. 5. This removes notch 108 in locking plate 104 from engagement with roller 96, so that circuit breaker 6 is no longer locked in its open circuit position. It is apparent, therefore, that closure of circuit breaker 4 unlocks circuit breaker 6, so that the latter breaker may be closed only after circuit breaker 4 is closed. Fig. 6 illustrates the condition where circuit breaker 6 is closed and circuit breaker 4 is open, and since under these circumstances circuit breaker 4 cannot be permitted to close without first opening circuit breaker 6, it will be observed in Fig. 6 that roller 96, having moved into the outwardly curved portion 120 of the opening 106 in locking plate 104, has permitted biasing springs 114 to rotate the locking plates counterclockwise from the positions shown in Figs. 4 and 5, to a position where notch 102 in locking plate 98 receives roller 94, to thereby lock circuit breaker 4 in open circuit position, and prevent closure thereof. It will be observed that the parts can be restored to the position shown in Fig. 4 only by opening circuit breaker 6, which will cause roller 96 to rotate the locking plates back to the position shown in Fig. 4, and thus release circuit breaker 4.

From the structure herein described, it will be apparent that the operating mechanism and interlocking means disclosed results in a structure wherein the several breakers can be operated only in a predetermined sequence, and wherein the three circuit breakers are actuated and controlled from but two actuating mechanisms associated with only two of the breakers. In other words, when the circuit breakers are all open, circuit breaker 6 is locked in open position and cannot be actuated, so that the only operation possible is closure of circuit breaker 4. This results in closure of starting breaker 8 through the medium of operating lever 68, and releases the mechanism of circuit breaker 6 so that only after breakers 4 and 8 have been closed can breaker 6 be closed. Closure of circuit breaker 6 results in opening of starting breaker 8 through release of operating lever 68, as previously described. Opening of both breakers 4 and 6 results in restoration of the parts to their original position, that is, with all breakers open. However, if line breaker 4 should be opened while running breaker 6 remains closed, line breaker 4 will be locked in such open position and released only upon opening of running breaker 6. This means that in closing the circuit, the main line breaker and starting breaker must be closed first, and thereafter the running breaker may be closed, resulting in opening of the starting breaker. The running breaker cannot be closed before the main line breaker and the starting breaker is closed, and in the event the running breaker is closed when the main line breaker is open, the running breaker must be opened before the line and starting breakers can be closed.

Having described a preferred embodiment of this invention in accordance with the patent statutes, it is desired that this invention be not limited to this particular embodiment of the invention, inasmuch as it will be obvious, particularly to persons skilled in the art, that many changes and modifications may be made in this particular structure, without departing from the broad spirit and scope of this invention. Moreover, the particular actuating mechanism and interlocking means for circuit controllers disclosed herein may obviously be employed with other types of circuit breakers than those illustrated, and even with other types of circuit controllers. Accordingly, it is desired that this invention be interpreted as broadly as possible in accordance with the invention as defined in the following claims.

I claim as my invention:

1. Circuit controlling means, comprising a plurality of circuit controlling devices each having separable contacts, actuating means for the contacts of a first one of said devices, motion transmitting means connecting said one device to a second one of said devices to close the contacts of said second device when the contacts of said first device are closed, and a third one of said devices being operable to release said motion transmitting means to permit operation of said second device independent of said first device when the contacts of said third device are closed.

2. Circuit controlling means, comprising a plurality of circuit controlling devices each having separable contacts, actuating means for the contacts of a first one of said devices, motion transmitting means connecting said one device to a second one of said devices to close the contacts of said second device when the contacts of said first device are closed, a third one of said devices being operable to release said motion transmitting means to permit operation of said second device independent of said first device when the contacts of said third device are closed, at least the contacts of said second device being biased apart so as to automatically separate upon closure of the contacts of said third device.

3. Circuit controlling means, comprising a plurality of circuit controlling devices, actuating means for a first one of said devices, motion transmitting means connecting said one device to a second one of said devices comprising lever means having a releasable fulcrum to cause operation of said second device in response to actuation of said first device, a third one of said devices, and means actuated by said third device when at one position to release said fulcrum when at one predetermined position thereof to permit operation of said second device independent of said first device.

4. Circuit controlling means, comprising a plurality of circuit controlling devices each having separable contacts, actuating means for the contacts of a first one of said devices, motion transmitting means connecting said one device to a second one of said devices to close the contacts of said second device when the contacts of said first device are closed, said motion transmitting means comprising lever means having a releasable fulcrum, a third one of said devices being operable to release said fulcrum when at one predetermined position thereof to permit operation of said second device independent of said first device, and at least the contacts of said second device being biased apart so as to automatically separate upon operation of said third device to its aforesaid one predetermined position.

5. Circuit controlling means, comprising a plurality of circuit controlling devices each having separable contacts, actuating means for the contacts of a first one of said devices, motion transmitting means connecting said one device to a second one of said devices to close the contacts of said second device when the contacts of said first device are closed, a third one of said devices being operable to release said motion transmitting means to permit operation of said second device independent of said first device when the contacts of said third device are closed, and means preventing closure of the contacts of said third device prior to operation of said first device to close its contacts and those of said second device.

6. Circuit controlling means, comprising a plurality of circuit controlling devices each having separable contacts, actuating means for the contacts of a first one of said devices, motion transmitting means connecting said one device to a second one of said devices to close the contacts of said second device when the contacts of said first device are closed, a third one of said devices being operable to release said motion transmitting means to permit operation of said second device independent of said first device when the contacts of said third device are closed, and interlocking cam means cooperable with the actuating means of said first and third devices for preventing closure of the contacts of said third device prior to operation of said first device to close its contacts and those of said second device.

7. Circuit controlling means, comprising a plurality of circuit controlling devices each having separable contacts, actuating means for the contacts of a first one of said devices, motion transmitting means connecting said one device to a second one of said devices to close the contacts of said second device when the contacts of said first device are closed, a third one of said devices being operable to release said motion transmitting means to permit operation of said second device independent of said first device when the contacts of said third device are closed, and means preventing closure of the contacts of said first and second devices when the contacts of said third device are closed.

8. Circuit controlling means, comprising a plurality of circuit controlling devices each having separable contacts, actuating means for the contacts of a first one of said devices, motion transmitting means connecting said one device to a second one of said devices to close the contacts of said second device when the contacts of said first device are closed, a third one of said devices being operable to release said motion transmitting means to permit operation of said second device independent of said first device when the contacts of said third device are closed, and interlocking cam means cooperable with actuating mechanism of said first and third devices for preventing closure of the contacts of said first and second devices when the contacts of said third device are closed.

9. Circuit controlling means, comprising a plurality of circuit controlling devices each having separable contacts and means for actuating said contacts to open and closed circuit positions, latch means for preventing a circuit closing operation of each device, one of said devices having means for releasing the latch means of another device when the contacts of said one device are closed to thereby permit closing of the contacts of said other device only after the contacts of said one device are closed, and said other device having means for releasing the latch means of said one device when the contacts of said other device are open, to thereby permit closure of the contacts of said one device only when the contacts of said other device are open.

10. Circuit controlling means, comprising a plurality of circuit controlling devices each having separable contacts and means for actuating said contacts to open and closed circuit positions, latch means for preventing a circuit closing operation of each device, said latch means comprising a movably mounted latch member for each of said devices, said latch members being coupled for movement together and being biased for movement in a direction to latch the respective actuating means of said devices in contact-closed position, the actuating means of one of said devices when in open circuit position having a part engageable with its latch member for maintaining the latch member of another device at a non-latching position, and the actuating means of said other device having a part engageable with its latch member when in open circuit position for maintaining the latch member of said one device at a non-latching position.

11. In circuit controlling means comprising a plurality of circuit breakers, each of said breakers having separable contacts biased apart and actuating mechanism movable in accordance with relative movement of said contacts, a pair of said breakers also having latch means for holding said mechanism in closed circuit position and trip means for releasing said latch means in response to predetermined electrical conditions, the combination of motion transmitting means connecting the actuation mechanisms of one of said pair of breakers with a third breaker, manually operable means for actuating said one breaker to close its contacts and the contacts of said third breaker, and means for rendering said motion transmitting means inoperative in response to closure of the other of said pair of breakers, to thereby permit independent opening of said third breaker when said other of said pair of breakers is closed.

12. Circuit controlling means comprising a plurality of circuit breakers, each of said breakers having separable contacts biased apart and actuating mechanism movable in accordance with relative movement of said contacts, a pair of said breakers also having latch means for holding said mechanism in closed circuit position and trip means for releasing said latch means in response to predetermined electrical conditions, the combination of motion transmitting means connecting the actuating mechanisms of one of said pair of breakers with a third breaker, manually operable means for actuating said one breaker to close its contacts and the contacts of said third breaker, and means for rendering said motion transmitting means inoperative in response to closure of the other of said pair of breakers, to thereby permit independent opening of said third breaker when said other of said pair of breakers is closed, and means interlocking the actuating mechanisms of said pair of breakers to prevent closing of said one breaker when said other breaker is closed and to prevent closing of said other breaker when said one breaker is open.

13. Circuit controlling means comprising a plurality of circuit breakers, each of said breakers having separable contacts biased apart and actuating mechanism movable in accordance with relative movement of said contacts, a pair of said breakers also having latch means for holding said mechanism in closed circuit position and trip means for releasing said latch means in response to predetermined electrical conditions, the combination of a separate latch for the actuating mechanism of each of said pair of breakers, to maintain the contacts of each in open circuit position, the actuating mechanism of one breaker having means to release the latch for the other breaker when said one breaker is actuated to closed circuit position, and the actuating mechanism of said other breaker having means to hold the latch of said one breaker released when the contacts of said other breaker are in open circuit position.

14. Circuit controlling means, comprising a plurality of circuit controlling devices each having separable contacts, actuating means for the contacts of a first one of said devices, motion transmitting means connecting said one device to a second one of said devices to operate the contacts of said second device to one predetermined position when the contacts of said first device are actuated to one predetermined position, and a third one of said devices being operable to release said motion transmitting means to permit operation of said second device independent of said first device when the contacts of said third device are actuated to one predetermined position.

ROBERT C. BOYD.